Figure 1:
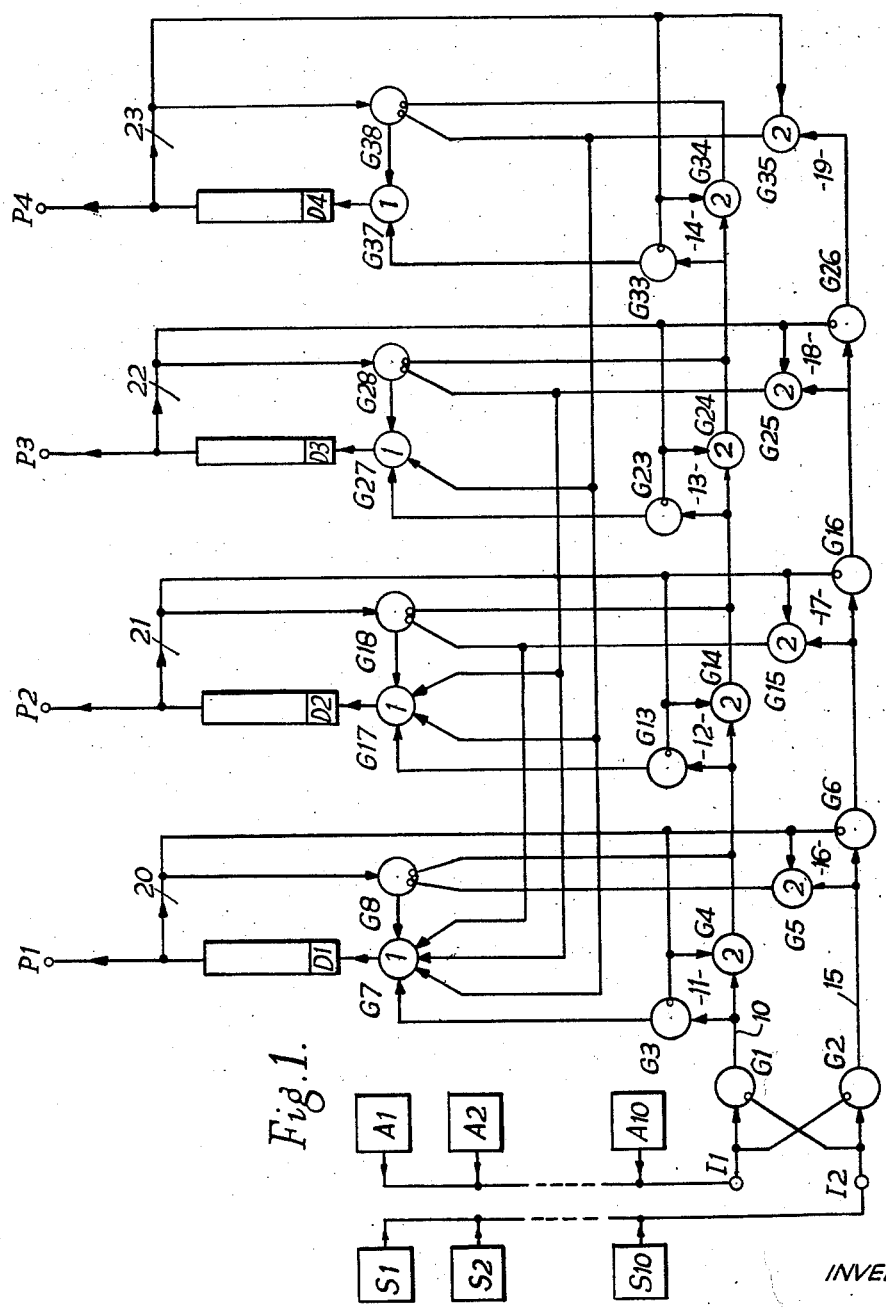

Oct. 22, 1963

W. S. DOUGLAS 3,108,226

ELECTRICAL PULSE-COUNTING DEVICES

Filed March 4, 1959

2 Sheets-Sheet 1

INVENTOR
WILLIAM SHOLTO DOUGLAS
BY
Craig and Freudenberg
ATTORNEYS

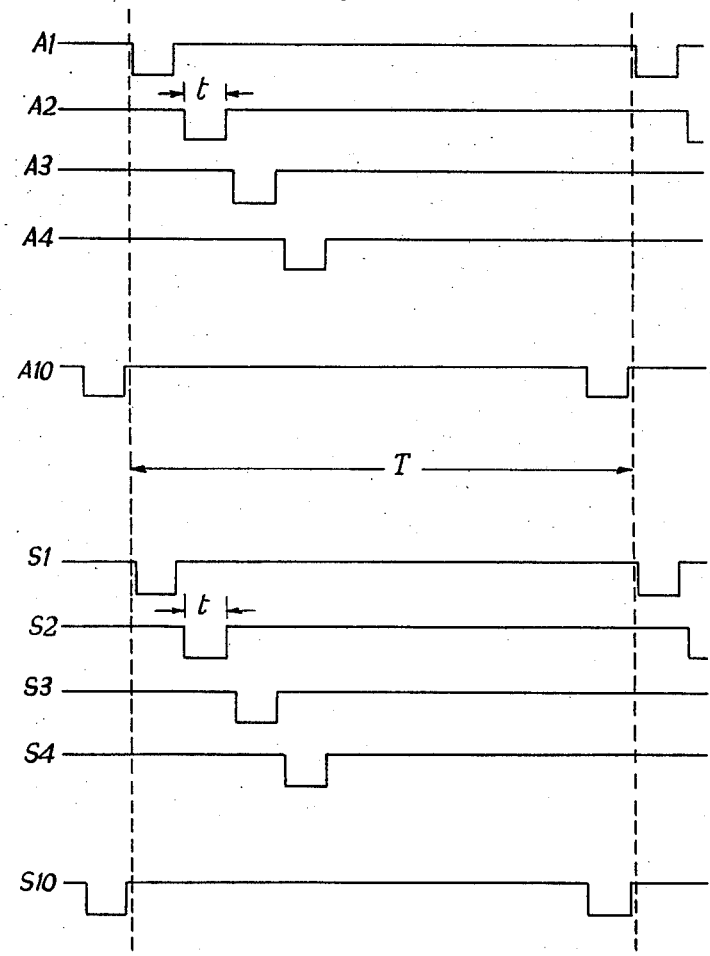

United States Patent Office 3,108,226
Patented Oct. 22, 1963

3,108,226
ELECTRICAL PULSE-COUNTING DEVICES
William Shelto Douglas, Norwood Green, Southall, England, assignor to Ericsson Telephones Limited, London, England, a British company
Filed Mar. 4, 1959, Ser. No. 797,284
Claims priority, application Great Britain Mar. 18, 1958
13 Claims. (Cl. 328—42)

The present invention relates to electrical pulse-counting devices and is concerned with circuits for counting pulses of the type which occur only in periodically recurring intervals of time, hereinafter referred to as pulse intervals, each pulse substantially occupying the interval in which it occurs. A pulse may be present in, or absent from, any pulse interval.

Thus, if $T$ is the repetition period of the pulse intervals the interval between successive pulses will be $T$, $2T$, or in general $mT$, where $m$ is an integer.

According to the present invention, an electrical pulse counter for subtractive counting of pulses of the type defined, comprises a plurality of pulse stores, each store including a delay device having its output connected to its input by a feedback loop including gating means adapted to permit and prevent circulation of pulses in the store, the delay time of each delay device being equal to the period of the said pulse intervals, and a sequence of gating circuits associated with the stores respectively and connected between the stores and an input circuit in such a manner that, in operation, a pulse applied to the sequence of gating circuits from the input circuit is prevented from passing through the sequence beyond the first gating circuit in the sequence which is associated with a store having a circulating pulse present at the output of its delay device coincident with the applied pulse, and the applied pulse causes the pattern of stores in which pulses are circulating to be changed, in dependence upon which gating circuit of the sequence the applied pulse was prevented from passing beyond, to the pattern representative in a predetermined numerical system of the number one below the number represented by the previously obtaining pattern.

For the purpose of this specification the term "pattern" applied to the stores in which pulses are circulating includes the cases where pulses are circulating in all stores and in no stores. The pattern may be caused to be changed in accordance with any numerical system but a binary system may be preferred in which succeeding stores represent succeeding powers of the base 2. Thus for example pulse circulation in first, second and third stores would represent a count of the binary number 111, in other words a count of seven.

Thus in a preferred embodiment, for subtractive counting in the binary code, it is arranged that the applied pulse causes the circulation of the pulse circulating in the store associated with the said first gating circuit in the sequence to be arrested and causes a circulating pulse to be established in each of the stores associated with the gating circuits, if any, preceding the said first gating circuit in the sequence.

In another embodiment it is arranged that the applied pulse causes the circulation of the pulse circulating in the store associated with the said first gating circuit in the sequence to be arrested and causes a circulating pulse to be established in the store associated with the gating circuit immediately preceding the said first gating circuit in the sequence.

Such an embodiment counts on a numerical system to a base of $n$ where $n$ is the number of stores and the number of gating circuits in the sequence.

A general type of gating circuit which may be used in carrying the invention into effect has an input terminal, first and second output terminals and an operating terminal. The input terminal is connected to the first output terminal of the preceding gating circuit and the first output terminal is connected to the input terminal of the succeeding gating circuit. The operating terminal is connected to the output of the delay device of the associated store. In the absence of a pulse on the operating terminal the input terminal is connected through to the first output terminal only. When a pulse is present on the operating terminal the input terminal is connected through to the second output terminal. This second output terminal is connected to such gating means in the feedback loops of the stores and to such inputs of the delay devices of the stores as are appropriate to effect the required change of pattern by the arresting and establishment of circulating pulses. The last mentioned connections must in general be made through rectifiers of 1-gates in order to prevent commoning through the second output terminals.

A further embodiment of the invention comprises a second sequence of gating circuits associated with the stores respectively and connected between the stores and a second input circuit in such a manner that, in operation, a pulse applied to the second sequence of gating circuits from the second input circuit is prevented from passing through the second sequence beyond the first gating circuit in the second sequence which is associated with a store having no circulating pulse present at the output of its delay device coincident with the applied pulse, and the applied pulse causes the pattern of stores in which pulses are circulating to be changed, in dependence upon which gating circuit of the second sequence the applied pulses was prevented from passing beyond, to the pattern representative in the predetermined numerical system of the number one above the number represented by the previously obtaining pattern.

Such a counter is adapted to count the difference between the numbers of pulses applied to the two input circuits and pulses applied to the two input circuits will hereinafter be referred to as "subtract" pulses and "add" pulses respectively.

It will be appreciated that counters according to the invention can be used to count pulses from a plurality of sources or a plurality of pairs of sources of "add" and "subtract" pulses when the pulse intervals of the different sources or pairs of sources are interlaced with each other.

The invention will now be described, by way of example, with reference to the accompanying drawings, in which:

FIG. 1 is a block circuit diagram of an embodiment of the invention adapted to count in binary code a plurality of numerical differences from pairs of sources of add and subtract pulses, and, FIG. 2 shows graphically the pulse intervals of add and subtract pulses of different pairs of sources.

The device shown in FIG 1 has two input terminals I1 and I2 to which are applied add pulses and subtract pulses respectively. The pulses are generated by sources A1, A2 . . . A10 of add pulses and sources S1, S2 . . . S10 of subtract pulses. The pulse intervals appertaining to the sources A1, A2, A3, A4, A10, S1, S2, S3, S4 and S10 are shown in FIG. 2. Each pulse interval is of duration $t$ and the pulse intervals for each source occur with a period of T where T is slightly longer than 10$t$. The sources A1 and S1 form a pair of sources of add and subtract pulses respectively, both having the same pulse intervals. The sources A2 and S2 form another pair and so on.

The terminal I1 is connected to the input of an inhibitory gate G1 and to the inhibitory input of an inhibitory gate G2. The terminal I2 is connected to the input of the gate G2 and to the inhibitory input of the gate G1.

The output of the gate G1 is connected to a lead 10 which is connected through a sequence of four gating circuits 11, 12, 13 and 14. Thus the lead 10 is connected to inputs of an inhibitory gate G3 and a 2-gate G4. The output of the gate G4 is connected to inputs of an inhibitory gate G13 and a 2-gate G14. The output of the gate G14 is connected to inputs of an inhibitory gate G23 and a 2-gate G24. The output of the gate G24 is connected to inputs of an inhibitory gate G33 and a 2-gate G34.

The output of the gate G2 is connected to a lead 15 which is connected through a sequence of four gating circuits 16, 17, 18 and 19. Thus the lead 15 is connected to inputs of a 2-gate G5 and an inhibitory gate G6. The output of the gate G6 is connected to inputs of a 2-gate G15 and an inhibitory gate G16. The output of the gate G16 is connected to inputs of a 2-gate G25 and an inhibitory gate G26. The output of the gate G26 is connected to one input of a 2-gate G35.

Associated with the pairs of gating circuits 11—16, 12—17, 13—18, and 14—19 are four pulses stores 20 to 23 respectively. The store 20 has a delay device D1 with an output terminal P1 connected through an inhibitory gate G8 and a 1-gate G7 to the input of the delay device D1. Thus the delay device D1 is provided with a feedback loop including gating means G8 whereby the circulation of pulses in the store can be permitted and prevented. A like store comprising a delay device D2, an output terminal P2, an inhibitory gate G18 and a 1-gate G17 is associated with the circuits 12 and 17. A like store comprising a delay device D3, an output terminal P3, an inhibitory gate G28 and a 1-gate G27 is associated with the circuits 13 and 18. A like store comprising a delay device D4, an output terminal P4, an inhibitory gate G38 and a 1-gate G37 is associated with the circuits 14 and 19.

The gating circuits 11 through 14 are each identical, whereas, the intermediate gating circuits 16, 17 and 18 in the sequence for subtracting are identical while the last gating circuit of this sequence does not require an inhibitory gate and, accordingly, includes merely the 2-gate G35.

The delay devices D1, D2, D3 and D4 each have a delay time of T.

The output terminal P1 is connected to inhibitory inputs of the gates G3 and G6 and to inputs of the 2-gates G4 and G5. The output terminal P2 is connected to inhibitory inputs of the gates G13 and G16 and to inputs of the 2-gates G14 and G15. The output terminal P3 is connected to inhibitory inputs of the gates G23 and G26 and to inputs of the 2-gates G24 and G25. The output terminal P4 is connected to the inhibitory input of the gate G33 and to inputs of the 2-gates G34 and G35.

The 1-gate G7 has further inputs connected to the outputs of the gates G3, G15, G25 and G35. The gate G8 has two inhibitory inputs connected to the outputs of the gates G4 and G5. The 1-gate G17 has further inputs connected to the outputs of the gates G13, G25 and G35. The gate G18 has two inhibitory inputs connected to the outputs of the gates G14 and G15. The 1-gate G27 has further inputs connected to the outputs of the gates G23 and G35. The gate G28 has two inhibitory inputs connected to the outputs of the gates G24 and G25. The 1-gate G37 has a further input connected to the output of the gate G33. The gate G38 has two inhibitory inputs connected to the outputs of the gates G34 and G35.

The operation of the circuit will now be described. It will be assumed that no add or subtract pulses have been applied to the input terminals I1 and I2, so that no output signals are present at output terminals P1 to P4. When an add pulse from, for example, the source A1 is applied to the input terminal I1, the gate G2 is inhibited for the duration $t$ of the add pulse and the gate G1 which is not inhibited produces an output signal of duration $t$ which is applied to the gates G3 and G4. The gate G4 requires two coincident input signals to produce an output signal so that no output signal is produced by the gate G4. An inhibitory signal is not applied to the gate G3 and hence the output signal from the gate G1 is passed by way of the gates G3 and G7 to the input of the delay device D1. After a period T has elapsed an output signal appears at the output terminal P1 and is applied to the gate G8, the gate G5 and the inhibitory inputs of the gates G3 and G6. The gate circuit G8 is not inhibited and the output signal from the delay device D1 is fed back to the input of the delay device D1 by way of the gates G8 and G7. Thus, a signal of duration $t$ and in the same pulse interval as a pulse from the source A1 will appear at the output terminal P1 at recurring intervals of T. The output signal present at the terminal P1 during these pulse intervals indicates that one add pulse from the source A1 has been applied to the input terminal I1. When a further add pulse from the source A1 is applied to the input terminal I1 it is passed by way of the gate G1 to the gates G3 and G4. The gate G3 is inhibited for the duration of the add pulse by the output signal from the delay device D1, but the gate G4 which has a second input signal from the delay device D1 for the duration of the add pulse, produces an output signal which is applied to the gates G13 and G14 and to one of the inhibitory inputs of the gate G8. The signal applied to the gate G8 prevents the output signal from the delay device D1 from being fed back to the input so that no further signals are provided at the output terminal P1. The gate G14 requires two coincident input signals to produce an output signal so that no output signal is produced at the gate G14. An inhibitory input is not present at the gate G13 and the output signal from the gate G4 is passed by way of the gates G13 and G17 to the input of the delay device D2. After a period T has elapsed at the delay device D2 an output signal appears at the output terminal P2, and is applied to the gate G18, the gate G15 and the inhibitory inputs of the gates G13 and G16. The gate G18 is not inhibited and the output signal from the delay device D2 is fed back to the input at recurring intervals of T. Thus a signal of duration $t$ and in the same pulse interval as a pulse from the source A1 will appear at the output terminal P2 at recurring intervals of T, indicating that two add pulses from the source A1 have been applied to the input terminal I1.

When a third add pulse from the source A1 is applied to the input terminal I1, the gate G3 is not inhibited as a signal is not provided at the output terminal P1 in the pulse intervals of the source A1. The output signal produced at the gate G1 is passed to the input of the delay device D1 and is fed back from the output to the input of the delay device D1 during the subsequent pulse intervals of the source A1. Thus output signals will be present at the output terminals P1 and P2 indicating that three add pulses from the source A1 have been applied to the input terminal I1. A fourth add pulse from the source A1 will remove the output signals at the output terminals P1 and P2 and establish recurring output signals at the output terminal P3.

In a similar manner add pulses from the pulse source A2 applied to the input terminal I1 will be stored in the delay devices D1 to D4, and will produce recurring output signals at the appropriate output terminals P1 to P4 during the pulse intervals of the source A2. Similarly add pulses from the other sources may be applied to the input terminal I1 and will produce output signals at the terminals P1 to P4 during the respective pulse intervals.

It will now be assumed that four add pulses from the source A1 have been applied to the input terminal I1 so that an output signal is produced at the output terminal P3 during the pulse intervals of the source A1. When a subtract pulse from the source S1 is applied to the terminal I2, the gate G1 is inhibited for the duration $t$ of the subtract pulse, and the gate G2 which is not inhibited produces an output signal of duration $t$ which is applied to the gates G5 and G6. The gate G5 requires two coincident input signals to produce an output signal so that no output signal is produced at the gate G5. An inhibitory signal is not present at the gate G6 and the output signal from the gate G2 is passed to the gate G16. Similarly the gate G16 is not inhibited and the signal is passed to the gates G25 and G26. The gate G26 is inhibited for the duration $t$ of the applied signal by an output signal from the delay device D3, but the gate G25 which also receives a signal from the delay device D3 produces an output signal which is applied to the gates G17 and G7 and one of the inhibitory inputs of the gate G28. The signal fed back from the output to the input of the delay device D3 during the pulse interval of the sources S1 and A1 is interrupted by the gate G28 and ceases. The signal applied to the gates G17 and G7 causes circulating signals to be established in the delay devices D2 and D1 respectively, thus producing output signals at the terminals P1 and P2. When a further subtract pulse from the source S1 is applied to the terminal I2, the gate G2 produces an output signal which is applied to the gates G5 and G6. The gate G6 is inhibited for the duration $t$ of the applied signal by a signal from the delay device D1, but the gate circuit G5 produces an output signal due to the coincident signal from the delay device D1. This output signal is applied to one of the inhibitory inputs of the gate G8 and thus causes the signal circulating through the delay device D1 to cease. Thus an output signal is present at the output terminal P2 only, indicating that the numerical difference between the number of add and subtract pulses applied during the pulse intervals of the sources A1 and S1 is two. A further subtract pulse from the source S1 removes the output signal from the output terminal P2 and establishes an output signal at the output terminal P1, thus indicating that the numerical difference has been reduced to one.

Similarly, pluralities of add pulses from the other pulse sources A2 to A10 which are stored in binary code form in the delay devices D1 to D4 may each be progressively reduced by the application of subtract pulses from the associated pulse sources S2 to S10. Should an add pulse coincide with a subtract pulse each inhibits the other at the gates G1 and G2 so that no change is made to the numerical difference stored in that particular pulse interval. The arrangement will only count and store positive numerical differences, that is it is assumed that the add pulses from one source will always exceed the subtract pulses from the associated source.

In practice the pulse period $t$ of the add and subtract pulses may be one micro-second, and the delay period T of each delay device D may be one milli-second, so that 900 pairs of contradictory pulse source can conveniently be connected to the input terminals I1 and I2. Each numerical difference will appear at the output terminals for one micro-second during each milli-second period and may be "read out" by suitable gating arrangements.

It will readily be appreciated that the arrangement shown may be extended to count much larger numerical differences than fifteen by the addition of further delay devices and associated gating circuits.

I claim:

1. An electrical pulse counter for subtractive counting of pulses occurring at intervals of $m$T where $m$ is an integer which is, in general, variable, comprising a plurality of pulse stores, each including a delay device having an input and an output, and a pulse transmission path between said input and said output effectively forming a feedback loop coupling said input to said output and gating means in said feedback loop and adapted to interrupt circulation of pulses in said store, the pulse velocity along said path and the length of said path being such as to give said delay device a delay time T equal to said velocity divided by said length, a sequence of gating circuits associated with said stores respectively and each having an input terminal, at least, one output terminal effectively providing a plurality of outputs and an operating terminal, input means to the first gating circuit of said sequence, connecting means coupling an output terminal of each of said gating circuits except the last in said sequence to the input terminal of the next gating circuit in the sequence, second connecting means coupling a second output terminal of each gating circuit to the gating means of the respective one of said stores, and further means connecting the outputs of said delay devices to said operating terminals respectively, whereby a pulse applied to said input means is prevented from passing through said sequence of gating circuits beyond the first such circuit associated with a store having a circulating pulse present at the output of its delay device coincident with the applied pulse and some of said second connecting means each connecting the second output terminal of a respective gating circuit with a store associated with a different gating circuit so that the applied pulse causes the pattern of stores in which pulses are circulating to be changed, in dependence upon which gating circuit of said sequence the applied pulse is prevented from passing beyond, to the pattern representative in a predetermined numerical system of the number one below the number represented by the previously obtaining pattern.

2. A counter according to claim 1 and adapted to count in the binary code, wherein said second connecting means include respective means to couple an output terminal of each gating circuit other than the first to the input of each delay device associated with a preceding gating circuit whereby said applied pulse causes a circulating pulse to be established in each of the stores associated with the gating circuit, if any, preceding the said gating circuit of said sequence beyond which passage of said pulse is prevented.

3. A counter according to claim 1 and adapted to count on a numerical system to the base $n$ where $n$ is the number of gating circuits in said sequence, wherein said second connecting means include respective means to couple an output terminal of each gating circuit other than the first to the input of the delay device associated with the immediately preceding gating circuit, whereby said applied pulse causes a circulating pulse to be established in the store associated with the gating circuit immediately preceding the said gating circuit, whereby said applied pulse causes a circulating pulse to be established in the store associated with the gating circuit immediately preceding the said gating circuit of said sequence beyond which passage of said pulse is prevented.

4. An electrical pulse counter for subtractive counting of pulses occurring at intervals, of $m$T where $m$ is an integer which is, in general, variable, comprising a plurality of pulse stores, each including a delay device of delay time T with an input and an output, a feedback loop coupling said input to said output and gating means in said feedback loop and adapted to interrupt circulation of pulses in said store, a sequence of gating circuits associated with said stores respectively and each having an input terminal, at least one output terminal and an operating terminal, input means to the first gating circuit of said sequence, connecting means coupling output terminals of said gating circuits respectively to the input terminals of the next gating circuits in the sequence and to said stores, and further means connecting the outputs of said delay devices to said operating terminals respectively, whereby a pulse applied to said input means is prevented from passing through said sequence of gating circuits beyond the first such circuit associated with a store having a circulating pulse present at the output of its delay device coincident with the applied pulse and the applied pulse causes the pattern of stores in which pulses are circulating to be changed, in dependence upon which gating circuit of said sequence the applied pulse is prevented from passing beyond, to the pattern representative in a predetermined numerical system of the number one below the number represented by the previously obtaining pattern, each intermediate gating circuit of said sequence having first and second output terminals, said input terminal of each intermediate gating circuit being connected to the first output terminal of the preceding gating circuit, said first output terminal being connected to the input terminal of the succeeding gating circuit, said operating terminal being connected to the output of the delay device of the associated store and said second output terminal being connected to at least one of the inputs of the stores and gating means of the stores, wherein in the absence of a pulse on the operating terminal the input terminal is connected through to the first output terminal only and, when a pulse is present on the operating terminal, the input terminal is connected through to the second output terminal.

5. A pulse counter according to claim 4, wherein each intermediate gating circuit comprises a 2-gate with two input terminals and one output terminal and an inhibitory gate with one input terminal, one inhibitory terminal and one output terminal, the said operating terminal consisting of one input terminal of the 2-gate and the inhibiting terminal of the inhibitory gate, the said gating circuit input terminal consisting of the other input terminal of the 2-gate and the input terminal of the inhibitory gate, the said first gating circuit output terminal consisting of the output terminal of the inhibitory gate and the second gating circuit output terminal consisting of the output terminal of the 2-gate.

6. An electrical pulse counter for subtractive counting of pulses occurring at intervals, of $mT$ where $m$ is an integer which is, in general, variable, comprising a plurality of pulse stores, each including a delay device of delay time $T$ with an input and an output, a feedback loop coupling said input to said output and gating means in said feedback loop and adapted to interrupt circulation of pulses in said store, a sequence of gating circuits associated with said stores respectively and each having an input terminal, at least one output terminal and an operating terminal, input means to the first gating circuit of said sequence, connecting means coupling output terminals of said gating circuits respectively to the input terminals of the next gating circuits in the sequence and to said stores, and further means connecting the outputs of said delay devices to said operating terminals respectively, whereby a pulse applied to said input means is prevented from passing through said sequence of gating circuits beyond the first such circuit associated with a store having a circulating pulse present at the output of its delay device coincident with the applied pulse and the applied pulse causes the pattern of stores in which pulses are circulating to be changed, in dependence upon which gating circuit of said sequence the applied pulse is prevented from passing beyond, to the pattern representative in a predetermined numerical system of the number one below the number represented by the previously obtaining pattern, a second sequence of gating circuits associated with the stores respectively and each having an input terminal, at least one output terminal and an operating terminal, further input means to the first gating circuit of said second sequence, further connecting means coupling output terminals of said gating circuits to the input terminals of the next respective gating circuits in the second sequence and to said stores, and yet further means connecting the outputs of said delay devices to the last said operating terminals respectively whereby a pulse applied to said further input means is prevented from passing through said second sequence of gating circuits beyond the first such circuit associated with a store not having a pulse present at the output of its delay device coincident with the applied pulse and the applied pulse causes the pattern of stores in which pulses are circulating to be changed, in dependence upon which gating circuit of said sequence the applied pulse is preventing from passing beyond, to the pattern representative in a predetermined numerical system of the number one above the number represented by the previously obtaining pattern.

7. A counter according to claim 6, wherein said input means and said further input means each comprise an inhibitory gate having an input terminal and an inhibitory terminal, the inhibitory terminal of each inhibitory gate being connected to the input terminal of the other gate.

8. A counter according to claim 6, wherein each intermediate gating circuit of said second sequence has an input terminal, first and second output terminals and an operating terminal, said input terminal being connected to the first output terminal of the preceding gating circuit, said first and second output terminal being connected to inputs of said stores and gating means of said stores, wherein in the absence of a pulse on the operating terminal the input terminal is connected through to the second output terminal and when a pulse is present on the operating terminal the input terminal is connected through to the second output terminal.

9. A pulse counter according to claim 8, wherein each intermediate gating circuit comprises a 2-gate with two input and one output terminal and an inhibitory gate with one input terminal, one inhibitory terminal and one output terminal, the said operating terminal consisting of one input terminal of the 2-gate and the inhibitory terminal of the inhibitory gate, the said input terminal consisting of the other input terminal of the 2-gate and the input terminal of the inhibitory gate, the said first output terminal consisting of the output terminal of the 2-gate and the second output terminal consisting of the output terminal of the inhibitory gate.

10. A pulse counter according to claim 8, wherein the first output terminal of each intermediate gating device is connected to the gating means of the associated store and the second output terminal of each gating device is connected to the input of the delay device of the associated store.

11. An electrical pulse counter for subtractive counting of pulses occurring at intervals of $mT$ where $m$ is an integer which is, in general, variable, comprising a plurality of pulse stores, each including a delay device of delay time $T$ with an input and an output, a feedback loop coupling said input to said output and inhibitory gating means having an inhibitory terminal and being connected in said loop to interrupt circulation of pulses in said store appearing at said output at the time of application of a pulse to said inhibitory terminal, a sequence of gating devices associated with said stores respectively and each comprising a 2-gate having two input terminals and an output terminal and an inhibitory gate having an input terminal, an inhibitory terminal and an output terminal, the last said terminal being connected to one input terminal of the 2-gate and the input terminal of the inhibitory gate of the next succeeding gating device, one input terminal of the 2-gate and the input terminal of the inhibitory gate being connected to the output terminal of the inhibitory gate of the next preceding gating device, the other input terminal of the 2-gate and the inhibitory terminal of the inhibitory gate being connected to the output of the delay device of the associated store and the output terminal of the 2-gate being connected to the inhibitory terminal of the inhibitory gating means of the associated store and to the input of the delay device of each preceding store.

12. A counter according to claim 11, further comprising a further sequence of gating devices associated with said stores respectively and each comprising an inhibitory gate having an input terminal, an inhibitory terminal and an output terminal and a 2-gate having two input terminals and an output terminal, the last said terminal being connected to the inhibitory terminal of the inhibitory gate and one of the input terminals of the 2-gate of the next succeeding device and to the inhibitory terminal of the inhibitory gating means of the associated store, the inhibitory terminals of the inhibitory gate and one of the input terminals of the 2-gate being connected to the output terminal of the 2-gate of the next preceding device, the other input terminal of the 2-gate and the inhibitory terminal of the inhibitory gate being connected to the output of the delay device of the associated store and the output terminal of the inhibitory gate being connected to the input of the delay device of the associated store.

13. A counter according to claim 12, comprising two further inhibitory gates, each having an input terminal, an inhibitory terminal and an output terminal, the output terminals being connected to the inputs of the respective sequences of gating circuits and the inhibitory terminal of each being connected to the input terminal of the other.

References Cited in the file of this patent

UNITED STATES PATENTS

| | | |
|---|---|---|
| 2,686,632 | Wilkinson | Aug. 16, 1954 |
| 2,735,005 | Steele | Feb. 14, 1956 |
| 3,011,706 | Goto | Dec. 6, 1961 |

FOREIGN PATENTS

| | | |
|---|---|---|
| 1,162,582 | France | Apr. 14, 1958 |

OTHER REFERENCES

"Arithmetic Operations in Digital Computers," by Richards, published by D. Van Nostrand Co. Inc., New York, page 197, FIG. 7–6.